United States Patent
De Vries et al.

(10) Patent No.: US 10,784,643 B2
(45) Date of Patent: Sep. 22, 2020

(54) REDUCING THE PULSE REPETITION FREQUENCY OF A PULSED LASER SYSTEM

(71) Applicant: Fraunhofer-Gesellschaft Zur Forderung Der Angewandten Forschung E.V., Munich (DE)

(72) Inventors: Oliver De Vries, Jena (DE); Jens Limpert, Jena (DE); Marco Plotner, Jena (DE)

(73) Assignee: Fraunhofer-Gesellschaft Zur Forderung Der Angewandten Forschung E.V., Munich (DE)

( * ) Notice: Subject to any disclaimer, the term of this patent is extended or adjusted under 35 U.S.C. 154(b) by 40 days.

(21) Appl. No.: 15/555,409

(22) PCT Filed: Mar. 2, 2016

(86) PCT No.: PCT/EP2016/054439
§ 371 (c)(1),
(2) Date: Oct. 5, 2017

(87) PCT Pub. No.: WO2016/139252
PCT Pub. Date: Sep. 9, 2016

(65) Prior Publication Data
US 2018/0041001 A1    Feb. 8, 2018

(30) Foreign Application Priority Data

Mar. 2, 2015 (DE) .......... 10 2015 102 964
Mar. 18, 2015 (DE) .......... 10 2015 104 084

(51) Int. Cl.
*H01S 3/00* (2006.01)
*G02F 1/11* (2006.01)
*H01S 3/13* (2006.01)

(52) U.S. Cl.
CPC ............ *H01S 3/0085* (2013.01); *G02F 1/113* (2013.01); *H01S 3/0057* (2013.01); *H01S 3/1307* (2013.01); *G02F 2203/54* (2013.01)

(58) Field of Classification Search
None
See application file for complete search history.

(56) References Cited

U.S. PATENT DOCUMENTS

2007/0071060 A1* 3/2007 Holzwarth ............... G01J 11/00
                                                                 372/98
2019/0386450 A1* 12/2019 Dumond ............... H01S 3/1003

OTHER PUBLICATIONS

International Search Report of the International Searching Authority with English Translation issued in the crresponding PCT International Application No. PCT/EP2016/054439, dated Jun. 6, 2016 (5 pages).

(Continued)

*Primary Examiner* — William R Alexander
*Assistant Examiner* — Gary W O'Neill
(74) *Attorney, Agent, or Firm* — Raymond R. Ferrera; Adams and Reese LLP

(57) ABSTRACT

A method for generating a laser pulse train is provided, including at least the following method steps: generating a laser pulse train at a pulse repetition frequency; coupling the laser pulse train into an acousto-optical modulator, and selecting individual laser pulses of the laser pulse train. A system for generating a laser pulse train is also provided, including at least a pulsed laser and an acousto-optical modulator, and an associated control device.

5 Claims, 2 Drawing Sheets

(56) References Cited

OTHER PUBLICATIONS

Written Opinion of the International Search Authority (Form PCT/ISA/237) with English Translation issued in the corresponding PCT International Application No. PCT/EP2016/054439, dated Jun. 20, 2016 (13 pages).
International Preliminary Report on Patentability Chapter I issued in the corresponding PCT International Application No. PCT/EP2016/054439, dated Sep. 5, 2017 (7 pages).
Gattass R R et al: "Micromachining of bulk glass with bursts of femtosecond laser pulses at variable repetition rates", Optics Express, OSA (Optical Society of America), Washington DC, (US), vol. 14, No. 12, Jun. 12, 2006 (1 page).
Bastian Borchers et al: "Acoustic frequency combs for carrier-envelope phase stabilization", Optics Letters, Optical Society of America, US, vol. 39, No. 3, Jan. 23, 2014 (1 page).
Oliver De Vries et al: "Acousto-optic pulse picking scheme with carrier-frequency-to-pulse-repetition-rate synchronization", Optics Express, vol. 23, No. 15, Jul. 20, 2015 (1 page).
Angewandte Physik & Elektronik GmbH: "Pulse Management", Nov. 23, 2013, Retrieved from the Internet: URL: www.ape-berlin.de/en/products/pulse-picker/pulseselect [retrieved on Jun. 3, 2016] (1 page).

\* cited by examiner

REDUCING THE PULSE REPETITION FREQUENCY OF A PULSED LASER SYSTEM

The invention relates to a method for generating a laser pulse train, comprising the following method steps:
- generating the laser pulse train at a pulse repetition frequency, e.g. by means of a pulsed laser;
- coupling the laser pulse train into an acousto-optical modulator, and
- selecting individual laser pulses of the laser pulse train by driving the acousto-optical modulator with high-frequency pulses, wherein the high-frequency pulses are generated by modulating a high-frequency carrier signal with a periodic switching signal.

In addition, the invention relates to a system for generating a laser pulse train, comprising a pulsed laser, which generates the laser pulse train at a pulse repetition frequency, and an acousto-optical modulator, in which the laser pulses propagate, and comprising a control device, which drives the acousto-optical modulator with high-frequency pulses for the purpose of selecting individual laser pulses.

Many pulsed laser systems, primarily mode-locked laser oscillators, generate a laser pulse train at a very high pulse repetition frequency (PRF). The corresponding peak pulse power or pulse energy in such systems is thus rather low. In order to increase these two parameters, it is known in the prior art to amplify the pulsed laser radiation. However, this increases not only the pulse energy and peak pulse power, but also the average power of the laser radiation. Optical amplifier systems are often limited by the average power rather than by the actual pulse parameters. Therefore, it is customary to reduce the PRF of the laser oscillator used before the radiation is amplified further, in order that the average power decreases, but the pulse energy and peak pulse power remain the same. In a more complex optical system, a PRF reduction and an amplification can be carried out in a plurality of stages, that is to say that the PRF is respectively adapted to the requirements of the downstream optical amplifier. It is thus possible to achieve a very high peak pulse power and pulse energy in conjunction with lower PRF.

In order to reduce the PRF, switching elements are used in the prior art, said switching elements also being referred to as "pulse pickers". In this case, individual laser pulses are selected from the laser pulse train.

The conventional pulse pickers for this application are electro-optical switches (Pockels cells), on the one hand, and acousto-optical switches, on the other hand.

Pockels cells make use of the Pockels effect to alter the refractive index of a birefringent nonlinear medium by generating an electric field, wherein a downstream polarizer can block the light pulses or allow them to pass. For this purpose, very high voltages (in the kV range) are required in practice, which means that fast switching is difficult and is complex and cost-intensive by virtue of highly developed power electronics required.

Acousto-optical modulators (AGMs) are simpler in terms of handling since they require lower voltages for driving and higher switching speeds can thus also be achieved. In the case of AOMs, the switching principle used is that the laser radiation is diffracted at a refractive index modification (Bragg grating) which is generated by high-frequency soundwaves via a piezo-crystal, which is driven with a correspondingly high-frequency electrical signal, in an optical crystal. By switching the electrical drive signal on and off sufficiently rapidly, it is possible to select individual laser pulses of the laser pulse train with an order of diffraction at the output of the AOM.

The use of an AOM as a pulse picker for reducing the PRF has two major disadvantages:

Firstly, amplitude fluctuations of the selected laser pulses occur. Since the position of the generated diffraction grating in the AOM crystal in relation to the beam path varies from laser pulse to laser pulse, each laser pulse is picked out with a different diffraction efficiency, which affects the peak pulse power of the selected laser pulses (pulse amplitude fluctuations) and leads to an increase in the relative peak intensity noise (RIN). The degree of the pulse amplitude fluctuations essentially depends on the focus size of the laser beam in the crystal, that is to say on the AOM design itself. This negative effect has been accepted hitherto, even though subsequent applications occasionally react very sensitively to intensity fluctuations.

A further disadvantage is that the concept of PRF reduction by means of an AOM has not been able to be applied hitherto to so-called CE-phase-stable laser pulse trains. A CE-phase-stable laser pulse train is understood to be a laser pulse train whose spectrum is an optical frequency comb having a defined offset frequency (also referred to as CEO frequency—"Carrier Envelope Offset"). In this case, the carrier envelope phase, i.e. the phase difference between the carrier wave and the intensity envelope of the laser pulses, differs from laser pulse to laser pulse by a phase difference value that is constant over the entire laser pulse train. In order to generate a high contrast between selected and non-selected laser pulses, the useful beam of the selected laser pulses is picked off with an order of diffraction of the AOM. However, the diffracted useful beam is thus simultaneously subjected to an optical frequency shift (Doppler shift) over the entire spectrum of the frequency comb. Therefore, this concept has not been able to be applied hitherto to CE-phase-stable laser systems since either (a) a new or (b) an indefinite frequency component is added to an existing CE offset frequency, which leads to the cancelation of the CE phase stability.

Against this background, it is an object of the invention to provide an improved method for selecting individual laser pulses from a laser pulse train. The intensity noise known from the prior art is intended to be reduced.

The invention achieves this object, proceeding from a method of the type mentioned in the introduction, by virtue of the fact that the following holds true for the frequency $f_{HF}$ of the carrier signal of the high-frequency pulses: $f_{HF}=n/p \cdot f_{PRF}$, wherein n is an arbitrary natural number and p indicates the integral ratio between the pulse repetition frequency and the frequency of the switching signal, and wherein the carrier signal is coupled to the laser pulse train in a phase-stable manner.

The invention furthermore achieves the object, proceeding from a system of the type mentioned in the introduction, by virtue of the fact that the control device is configured to generate the high-frequency pulses by modulating a high-frequency carrier signal with a periodic switching signal, wherein the following holds true for the frequency $f_{HF}$ of the carrier signal of the high-frequency pulses: $f_{HF}=n/p \cdot f_{PRF}$, referred to hereinafter as synchronism condition, wherein n is an arbitrary natural number and p indicates the "pulse picking" factor, i.e. the integral ratio between the pulse repetition frequency and the frequency of the switching signal, and wherein the carrier signal is coupled to the laser pulse train in a phase-stable manner.

The amplitude fluctuations of the selected laser pulses that occur in the prior art are associated with the use of so-called "Traveling Wave" AOMs, in which the acoustic waves that generate the optical diffraction grating by refractive index modification pass through the AOM crystal. The position of the diffraction grating in relation to the beam path thus varies from laser pulse to laser pulse.

The high-frequency pulses are generated by modulating the high-frequency carrier signal with a switching signal (e.g. rectangular signal). According to the invention, the carrier frequency of the high-frequency pulses applied to the AOM crystal in order to generate the acoustic waves is correlate with the switching signal by the fulfillment of the synchronism condition mentioned above. What is achieved as a result is that the position of the diffraction grating in relation to the beam path is always the same for the laser pulses passing successively through the AOM crystal. Each laser pulse is thus picked out with substantially the same diffraction efficiency. As a result, the peak pulse power is the same for each selected laser pulse and the relative peak intensity noise is significantly reduced.

Most practical cases involve reducing the PRF of the laser pulse train relative to that of the pulsed laser. In this case, the switching signal is expediently a periodic signal, wherein the PRF is an integral multiple of the frequency of the switching signal. In this case, the pulse repetition rate is reduced by a factor corresponding to said integral multiple. The switching signal can be e.g. a rectangular signal, wherein the duration of each rectangular pulse should be shorter than the pulse separation of two laser pulses of the laser pulse train.

As far as is possible the method according to the invention is intended also to be applicable to CE-phase-stable laser pulse trains, specifically in the sense that the pulse train consisting of the selected laser pulses is also CE-phase-stable. In this case, the spectrum of the laser pulse train generated by the pulsed laser and of the pulse train of the laser pulses selected according to the invention is in each case an optical frequency comb having a defined offset frequency.

To that end, according to the invention, the laser pulse train, the high-frequency carrier signal and the switching signal are synchronized. The synchronization of switching signal and laser pulse train corresponds to the prior art for customary "Pulse Pickers". This has the effect that e.g. every p-th (n shall stand for a natural number) laser pulse of the laser pulse train is selected. The invention directs attention to the additional synchronization between laser pulse train and carrier signal of the high-frequency pulses. The carrier signal is coupled to the laser pulse train of the pulsed laser overall in a phase-stable manner. In this case, the PRF of the pulsed laser $f_{PRF}$ is e.g. an integral multiple of the PRF $f_{PRF}$ of the laser pulse train reduced in terms of the pulse rate. In this case, it holds true that $f_{PRF} = p \cdot f_{PRF}$ (p is thus the "Pulse Picking" factor). In order to obtain the phase synchronism of laser pulse train, switching signal and carrier signal, according to the invention generally the frequency of the carrier signal can be a rational multiple of the PRF. The following synchronism condition thus holds true: $f_{HF} = n/p \cdot f_{PRF}$ (wherein n shall be a natural number).

In one possible special case (n/p integral) that can be realized particularly easily in practice, the frequency of the carrier signal is an integral multiple of the PRF of the pulsed laser. If e.g. the PRF of the pulsed laser is 100 MHz, then for the AOM it is possible to choose high-frequency carrier signals having the frequencies 100, 200, 300 . . . MHz, etc. The method can thus be implemented as long as an AOM that is adapted to these frequencies is available. If e.g. exclusively a 250 MHz AOM is available, n=5 and p=2 can be employed in order to generate the carrier frequency $f_{HF}$.

The synchronization described firstly achieves the effect that the diffraction grating generated in the AOM crystal is situated at the same position relative to the beam path of the laser radiation for each selected laser pulse that passes through the AOM crystal. Undesired amplitude fluctuations and intensity noise associated therewith are avoided. The synchronization described secondly has the effect that laser pulses can also be selected from a CE-phase-stable laser pulse train whilst maintaining the CE phase stability. Each CE-phase-stable laser pulse train has a defined CE offset frequency $f_{CEO}$, the absolute value of which is usually a fraction of the PRF: $f_{CEO} = f_{PRF}/a$ (a shall also be a natural number). In specific cases, the CE offset frequency can also be equal to zero. The frequency comb of the original laser pulse train shall be given by:

$$f_m = m \cdot f_{PRF} + f_{CEO} \text{ (} m \text{ shall once again be a natural number)}$$

If, according to the invention, the frequency of the carrier signal at the AOM is equal to n/p times the PRF, then the frequency comb of the pulse train of the selected laser pulses experiences by comparison a frequency shift by n/p times the PRF. The spectrum of the frequency comb of the selected laser pulses downstream of the AOM is thus given by:

$$f'_{(m)} = (m \pm n) \cdot f_{PRF}/p + f_{CEO} = (m \pm n) \cdot f'_{PRF} + f_{CEO}$$

What is important here is that upon the reduction of the PRF (from $f_{PRF}$ to $f'_{PRF}$) the jump in the carrier envelope phase $\Delta\varphi'_{CEO}$ does not change from selected laser pulse to selected laser pulse. It holds true that:

$$\Delta\varphi'_{CEO} = 2\pi \cdot f_{CEO}/f'_{PRF} \text{ (modulo } 2\pi\text{)}$$

For the case where the original $f_{CEO} = f_{PRF}/a$ is manifested, this results in:

$$\Delta\varphi'_{CEO} = 2\pi \cdot p/a \text{ (modulo } 2\pi\text{)}$$

With a suitable choice of the ratio p/a, it is thus possible to ensure that the jump in the carrier envelope phase is 0 or $2\pi$. This case is fulfilled wherever p/a is equal to a natural number. The frequency shift by the AOM accordingly has no effects on the CE phase stability of the pulse train of the selected laser pulses. This also applies to the specific case where $f_{CEO} = 0$.

In one preferred configuration of the system according to the invention, the control device not only generates the switching signal for driving a modulator (mixer) provided for modulating the carrier signal. It additionally drives a high-frequency synthesizer, which generates the carrier signal. Powerful digitally drivable high-frequency synthesizers are available as commercial components for the use according to the invention. They allow the high-frequency signal generated to be controlled variably according to frequency and phase. According to the invention, this can advantageously be utilized by virtue of the control device controlling the phase and the frequency of the carrier signal generated by the high-frequency synthesizer. The control of the phase of the carrier signal of the high-frequency pulses by means of the synthesizer makes it possible to move to the diffraction efficiency maximum of the AOM stably in a targeted manner. As explained above, intensity fluctuations of the laser pulses arise as a result of variation of the diffraction efficiency from laser pulse to laser pulse. This fluctuation is neutralized by the procedure according to the invention. In this case, the absolute phase angle determines the exact diffraction efficiency. As a result of the control of the phase by means of the synthesizer, the diffraction efficiency (stabilized according to the invention) can e.g. additionally also be moved to the maximum in a targeted manner. The overall efficiency of the pulse picking method rises as a result. The latter conventionally falls short of the maximum that the respective AOM would enable per se.

Exemplary embodiments of the invention are explained in greater detail below with reference to the drawings. In the figures.

Figure 1:
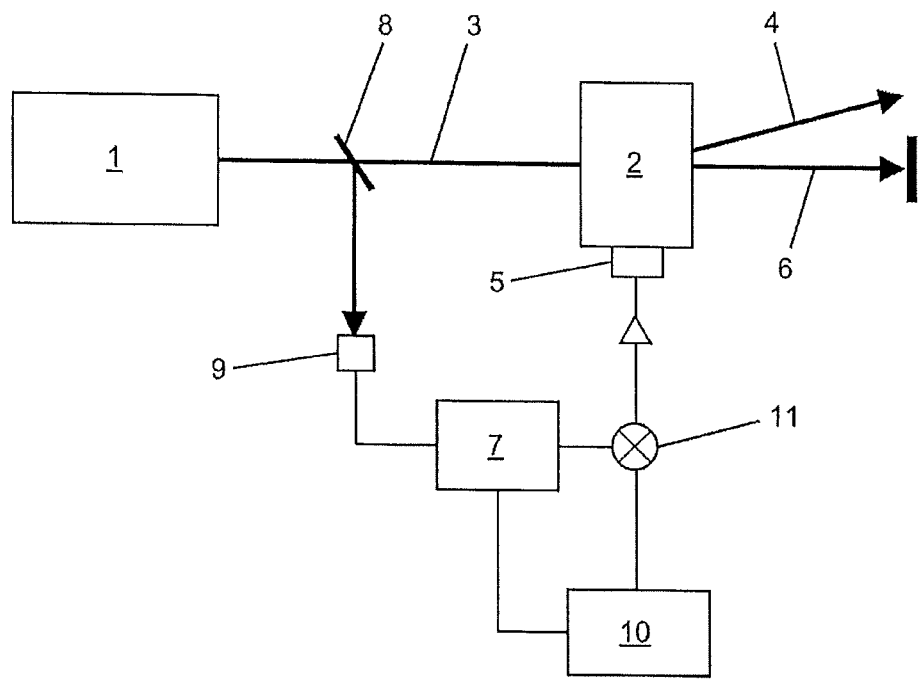
FIG. 1 shows a schematic view of a laser system according to the invention as a block diagram.

FIG. 1 illustrates a laser system according to the invention. The latter comprises a pulsed laser 1, which emits a sequence of short laser pulses. The pulsed laser 1 can be a Q-switched laser, a mode-locked femtosecond oscillator through to a CE-phase-stable laser of experimental or commercially available design. A traveling wave AOM 2 is provided for reducing the PRF. The laser beam 3 emitted by the pulsed laser 1 is coupled into the acousto-optical modulator 2. Selection of individual laser pulses of the laser pulse train with an order of diffraction 4 is carried out in the acousto-optical modulator 2. For this purpose, high-frequency pulses are applied to the AOM 2. The high-frequency pulses generate acoustic waves which propagate in the crystal of the AOM by means of a piezo-actuator 5. The wave pattern, by means of refractive index modification, generates an optical diffraction grating in the crystal of the AOM, at which the laser beam is diffracted during the duration of the respective high-frequency pulse. Outside the high-frequency pulses, the laser beam passes through the acousto-optical modulator without diffraction. The undiffracted laser beam 6 is blocked. The system illustrated furthermore comprises a control device 7. Part of the radiation emitted by the pulsed laser 1 is directed onto a photodetector 9 via a beam splitter 8. Said photodetector generates an electrical signal, the frequency of which is equal to the PRF of the laser pulse train generated by the pulsed laser 1. The control device 7, for its part, drives a high-frequency synthesizer 10. The output signal of the high-frequency synthesizer 10 is the carrier signal of the high-frequency pulses used to drive the piezo-actuator 5 of the AOM 2. Furthermore, the control device 7 generates a switching signal with which the high-frequency carrier signal is modulated via a modulator (mixer) 11. The control device 7 synchronizes the switching signal and the carrier signal with the PRF, as described above. In this case, the control device 7 drives the synthesizer 10 e.g. in such a way that the carrier signal generated by the synthesizer 10 is coupled to the laser pulse train of the pulsed laser 1 in a phase-stable manner. In this case, the control device 7 prescribes the frequency of the carrier signal e.g. such that it is an n/p multiple of the PRF.

Figure 2:
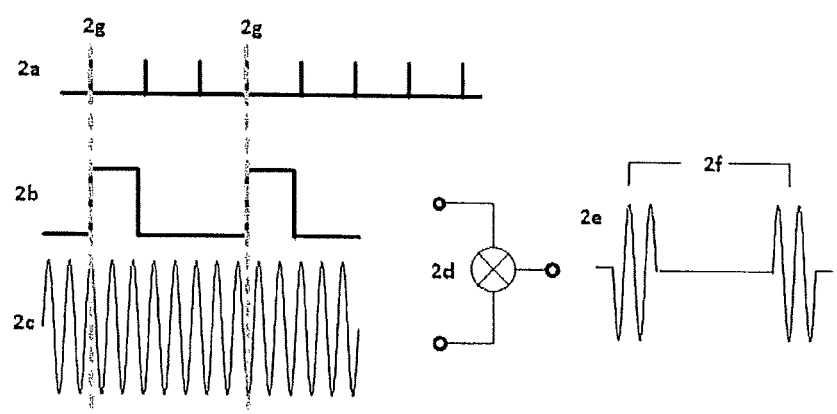
FIG. 2 shows an illustration of the selection of laser pulses from a pulse train in accordance with the prior art.

FIG. 2 illustrates the driving of the AOM as a "Pulse Picker", as is known from the prior art. 2a denotes the temporal profile of the laser pulse train having a multiplicity of laser pulses emitted equidistantly over time. 2b denotes the switching signal. In the example illustrated, the PRF is intended to be reduced to ⅓. Correspondingly, the frequency of the switching signal is equal to one third of the PRF. The switching signal has rectangular pulses whose duration is shorter than the pulse separation of the laser pulses. 2g indicates in each case the "Trigger" instant, i.e. that instant at which the switching signal is activated in each case. 2c denotes the high-frequency carrier signal, which initially is not synchronized with the light pulse train 2a or with the switching signal 2b. The carrier signal 2c is modulated with the switching signal 2b by means of a mixer 2d. The output signal of the mixer is designated by 2e. This signal is used to drive the piezo-actuator of the AOM for generating the optical diffraction grating. 2f denotes in each case the high-frequency pulses for selecting the laser pulses. As can be discerned in FIG. 2, the carrier signal has a respectively different phase angle within the high-frequency pulses 2f. Since the diffraction grating is correspondingly positioned differently relative to the laser beam from laser pulse to laser pulse, amplitude fluctuations and intensity noise result, which is undesired.

Figure 3:
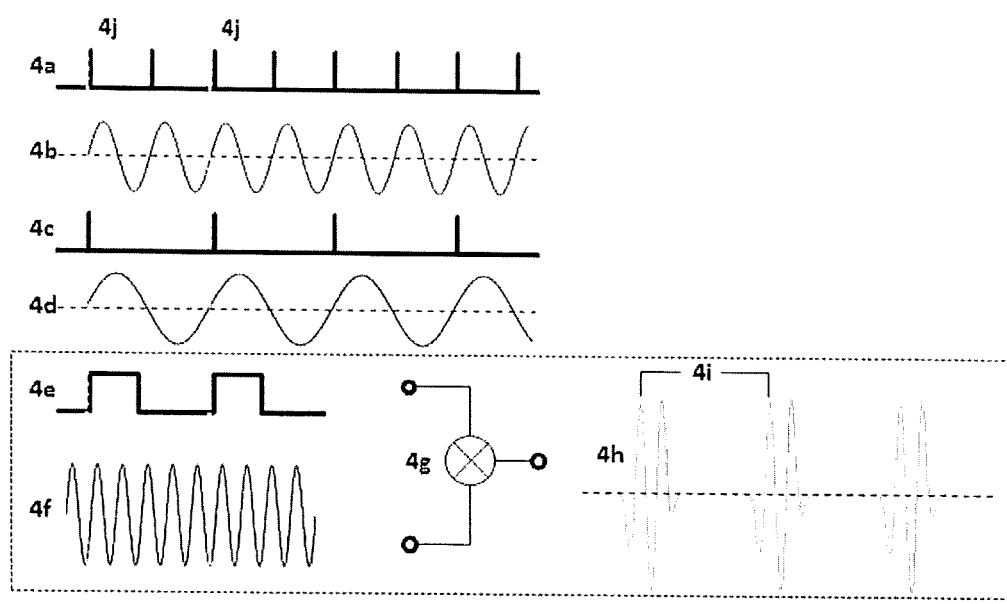
FIG. 3 shows an illustration of one exemplary embodiment of the method according to the invention.

FIG. 3 illustrates one exemplary embodiment of the method according to the invention. The laser pulse train is designated by 4a. 4b represents the fundamental frequency of the laser pulse train as a sinusoidal signal. The desired laser pulse train having a reduced PRF is shown at 4c. This laser pulse train is obtained by selection of the laser pulses in each case at the instants 4j. In the exemplary embodiment illustrated, the PRF is thus reduced to half relative to the original laser pulse train. 4d shows the fundamental frequency of the laser pulse train having a reduced PRF. The associated switching signal is designated by 4e. The drive signal 4h for the AOM is obtained from a carrier signal 4f by the mixer 4g. In contrast to the case shown in FIG. 2, in the exemplary embodiment illustrated in FIG. 3, the carrier signal 4f is synchronized with the laser pulse train, or the fundamental frequency 4b derived therefrom, and with the switching signal 4e. The switching signal 4e is derived from the light pulse train 4a, or the fundamental frequency 4b, by virtue of the frequency of the switching signal 4e being half the magnitude of the frequency of the laser pulse train 4a. In the exemplary embodiment illustrated, the frequency of the carrier signal 4f is a rational multiple, namely here triple the frequency of the laser pulse train 4a. In the driver signal 4h of the AOM generated by the mixing of the switching signal 4e and the carrier signal 4f, the high-frequency pulses 4i in each case have the same phase angle relative to the switching signal 4e, thereby ensuring that the diffraction efficiency of the AOM does not fluctuate and intensity noise is largely prevented. At the same time, as explained above, the synchronization according to the invention of light pulse train, switching signal and carrier frequency ensures that the method for reducing the PRF is possible in the case of a CE-phase-stable light pulse train, i.e. in the case of a light pulse train whose spectrum is an optical frequency comb having a defined offset frequency. The light pulse train 4c reduced in terms of the PRF is thus CE-phase-stable as well.

The method according to the invention can be applied to all pulsed laser systems whose PRF is intended to be reduced, assuming that a traveling wave AOM exists for the corresponding wavelength.

The invention provides an improved pulse-to-pulse stability of the laser pulse train. This opens up applications in the fields of micro-material processing, sensor technology, printing and inscription and also medical and military applications. The additional possibility that even CE-phase-stable lasers can be used opens up further areas of application in which lasers having a high pulse-to-pulse coherence are required. Such applications may be: cavity enhancement in Stack-and-Dump systems for e.g. the generation of higher harmonics and inverse Compton scattering. Low-noise CE-phase-stable laser systems are required in the field of attosecond physics as well. The invention may be beneficial with regard to future developments, particularly in the field of laser-based particle acceleration. One major advantage for all conceivable applications is that the approach according to the invention can be implemented very cost-effectively.

The invention claimed is:

1. A method for generating a laser pulse train, comprising the following method steps:
   generating the laser pulse train at a pulse repetition frequency $f_{PRF}$;
   coupling the laser pulse train into an acousto-optical modulator, and
   selecting individual laser pulses of the laser pulse train by driving the acousto-optical modulator with high-frequency pulses, wherein the high-frequency pulses are generated by modulating a high-frequency carrier signal with a periodic switching signal, wherein the high-frequency carrier signal generates an optical diffraction grating by refractive index modification passing through the acousto-optical modulator crystal, the following holds true for the frequency $f_{HF}$ of the carrier signal of the high-frequency pulses: $f_{HF}=(n/p) \cdot f_{PRF}$, wherein n is an arbitrary natural number and p indicates the integral ratio between the pulse repetition frequency and the frequency of the switching signal, wherein the carrier signal is coupled to the laser pulse train in a phase-stable manner, and wherein, as a result, the position of the diffraction grating in relation to the beam path of the laser pulse train is always the same for the laser pulses passing successively through the acousto-optical modulator crystal.

2. The method as claimed in claim 1, wherein the frequency of the carrier, signal is an integral multiple of the pulse repetition frequency.

3. The method as claimed in claim 1, wherein the spectrum of the laser pulse train is an optical frequency comb having a defined offset frequency.

4. A system for generating a laser pulse train, comprising a pulsed laser, which generates the laser pulse train at a pulse repetition frequency $f_{PRF}$, and an acousto-optical modulator, in which the laser pulses propagate, and comprising a control device, which drives the acousto-optical modulator with high-frequency pulses for the purpose of selecting individual laser pulses, wherein the high-frequency carrier signal generates an optical diffraction grating by refractive index modification passing through the acousto-optical modulator crystal,
   wherein the control device is configured to generate the high-frequency pulses by modulating a high-frequency carrier signal with a periodic switching signal, wherein the following holds true for the frequency $f_{HF}$ of the carrier signal of the high-frequency pulses: $f_{HF}=(n/p) \cdot f_{PRF}$, wherein n is an arbitrary natural number and p indicates the integral ratio between the pulse repetition frequency and the frequency of the switching signal, and wherein the carrier signal is coupled to the laser pulse train in a phase-stable manner, wherein the control device drives a high-frequency synthesizer, which generates the carrier signal and controls the phase and the frequency of the carrier signal generated by the high-frequency synthesizer such that the position of the diffraction grating in relation to the beam path of the laser pulse train is always the same for the laser pulses passing successively through the acousto-optical modulator crystal.

5. The system as claimed in claim 4, wherein the control device additionally generates a switching signal for driving a modulator provided for modulating the carrier signal.

* * * * *